United States Patent [19]
Kawamura et al.

[11] Patent Number: 6,003,647
[45] Date of Patent: Dec. 21, 1999

[54] TORQUE CONVERTER WITH LOCK-UP CLUTCH HAVING A FLOW-RESTRAINING ELASTIC FRICTION MEMBER

[75] Inventors: Takashi Kawamura, Ikoma; Hironori Oshikawa, Neyagawa, both of Japan

[73] Assignee: Exedy Corporation, Osaka, Japan

[21] Appl. No.: 09/129,862

[22] Filed: Aug. 6, 1998

[30] Foreign Application Priority Data

Aug. 14, 1997 [JP] Japan .................................. 9-219427

[51] Int. Cl.$^6$ ................................................. F16H 45/02
[52] U.S. Cl. ........................................ 192/3.29; 192/52.3
[58] Field of Search ..................................... 192/3.29, 3.3, 192/109 F, 109 A, 107 C, 52.6, 85 A, 3.28, 52.3

[56] References Cited

U.S. PATENT DOCUMENTS

| | | | |
|---|---|---|---|
| 4,469,206 | 9/1984 | Motomura et al. | 192/52.3 X |
| 5,385,222 | 1/1995 | Otto et al. | 192/3.29 |
| 5,501,309 | 3/1996 | Walth et al. | 192/3.29 |
| 5,738,198 | 4/1998 | Walth et al. | 192/3.29 X |
| 5,819,896 | 10/1998 | Fallu | 192/3.29 |

*Primary Examiner*—Charles A. Marmor
*Assistant Examiner*—Ankur Parekh
*Attorney, Agent, or Firm*—Shinjyu Global IP Counselors, LLP

[57] ABSTRACT

A torque converter is provided with a front cover (2) at the power input side, an impeller, a turbine (4), a stator (5), a piston (22), a plate spring (35), and a friction facing (36). The piston (22) is disposed in the space formed between the front cover (2) and the turbine (4) to divide the space into first and second hydraulic chambers (A) and (B). The first hydraulic chamber (A) is located between the piston (22) and the front cover (2), while the second hydraulic chamber (B) is located between the piston (22) and the turbine (4). The piston (22) can move close to and away from the front cover (2) by the pressure difference between the first hydraulic chamber (A) and the second hydraulic chamber (B). The piston (22) is opposite the front cover (2) and engages to the turbine (4) to enable the torque to be transmitted. The plate spring (35) is fixedly coupled to the piston (22) and is opposite the front cover (2). The friction facing (36) is fixedly coupled to the plate spring (35) and is located adjacent to the front cover (2). In the state where the piston (22) is disposed closest to the turbine (4), and at least when substantially no pressure difference exists between the first and second hydraulic chambers (A) and (B), the friction facing (36) is pressed against the front cover (2) by the plate spring (35) to increase the moving speed of the piston (22) when the lock-up clutch (7) of a torque converter (1) being engaged.

20 Claims, 4 Drawing Sheets

TORQUE CONVERTER WITH LOCK-UP CLUTCH HAVING A FLOW-RESTRAINING ELASTIC FRICTION MEMBER

BACKGROUND OF THE INVENTION

1. Field of the Invention

This invention generally relates to a torque converter. More specifically, the present invention relates to a torque converter having a lock-up clutch installed therein.

2. Background Information

Torque converters usually include a fluid coupling mechanism for transmitting torque between the crankshaft of an engine and the input shaft of an automatic transmission. In recent years, to improve fuel efficiency, some torque converters have included lock-up devices that, upon reaching predetermined operating conditions, lock-up the torque converters so that power from the crankshaft of an engine is directly transmitted to the automatic transmission, bypassing the fluid coupling device. Upon engagement, lock-up devices often cause a shudder, or vibration. Further, while engaged, the lock-up device is subject to vibrations caused by sudden acceleration, or deceleration, or other vibration including circumstances associated with internal combustion engines. Consequently, a torsional vibration dampening apparatus is typically employed in a lock-up mechanism to dampen vibration.

A torque converter has three types of runners (impeller, turbine, stator) located inside for transmitting the torque by means of an internal hydraulic oil or fluid. The impeller is fixedly coupled to the front cover that receives the input torque from the power input shaft. The hydraulic chamber formed by the impeller shell and the front cover is filled with hydraulic oil. The turbine is disposed opposite the front cover in the hydraulic chamber. When the impeller rotates, the hydraulic oil flows from the impeller to the turbine, and the turbine rotates. As a result, the torque is transmitted from the turbine to the main drive shaft of the transmission.

The lock-up clutch is disposed in the space between the front cover and the turbine. As mentioned above, the lock-up clutch is a mechanism to directly transmit the torque between the crankshaft of the engine and the drive shaft of the transmission by mechanically coupling the front cover and the turbine. The lock-up clutch includes primarily a piston and an elastic coupling mechanism to connect the piston to the members on the power output side of the turbine. The piston is disposed to divide the space between the front cover and the turbine into a first hydraulic chamber on the front cover side and a second hydraulic chamber on the turbine side. As a result, the piston can move close to and away from the front cover by the pressure difference between the first hydraulic chamber and the second hydraulic chamber. A friction joining member covered by friction facing is formed on the outer periphery of the front cover on the axial surface facing the piston. When the hydraulic oil in the first hydraulic chamber is drained and the hydraulic pressure in the second hydraulic chamber increases in pressure, the piston moves toward the front cover side. This movement of the piston causes the friction facing of the piston to strongly press against the friction surface of the front cover.

The elastic coupling mechanism functions as a torsional vibration dampening mechanism to dampen vibration in the lock-up clutch. The elastic coupling mechanism includes, for example, a drive member fixedly coupled to the piston, a driven member fixedly coupled to the turbine side, and an elastic member, such as one or more coil springs, disposed in between the drive member and the driven member to enable torque transmission.

When the lock-up clutch is engaged, the hydraulic oil in the first hydraulic chamber is drained from its inner circumferential side and the hydraulic oil is supplied to the second hydraulic chamber. As a result, the hydraulic pressure in the second hydraulic chamber becomes greater than the hydraulic pressure in the first hydraulic chamber. This pressure differential between the first and second hydraulic chambers causes the piston to move toward the front cover. During the movement of the piston, the hydraulic oil in the second hydraulic chamber sometimes flows through the gap between the friction facing and the friction surface of the front cover into the first hydraulic chamber. In this case, the hydraulic pressure in the second hydraulic chamber does not become large enough, and the moving speed of the piston becomes slower.

In view of the above, there exists a need for a torque converter, which overcomes the above mentioned problems in the prior art devices. This invention addresses this need in the prior art as well as other needs, which will become apparent to those skilled in the art from this disclosure.

SUMMARY OF THE INVENTION

The object of the present invention is to increase the moving speed of the piston when the clutch is engaged in the lock-up clutch of a torque converter.

The torque converter in accordance with one preferred embodiment of the present invention includes a front cover on the power input side, an impeller, a turbine, a stator, a piston, and a unidirectional throttle valve. The impeller is coupled to the front cover and forms a hydraulic chamber. The turbine is opposite the impeller in the hydraulic chamber. The stator is disposed between the impeller and the turbine. The piston is disposed to divide the space between the front cover and the turbine into the first hydraulic chamber on the front cover side and the second hydraulic chamber on the turbine side, and can move close to and away from the front cover by the pressure difference between the first and second hydraulic chambers. The piston has an opposing member that is opposite the front cover and is coupled to the turbine to enable the transmission of torque. The unidirectional throttle valve is disposed between the first hydraulic chamber and the second hydraulic chamber, allows the hydraulic oil to flow from the first hydraulic chamber to the second hydraulic chamber, and regulates the flow of hydraulic oil from the second hydraulic chamber to the first hydraulic chamber.

In the torque converter in accordance with one preferred embodiment of the present invention, during ordinary traveling, the hydraulic oil flows from the first hydraulic chamber through the unidirectional throttle valve to the second hydraulic chamber. When the hydraulic oil in the first hydraulic chamber is drained and the hydraulic oil is supplied to the second hydraulic chamber to engage the lock-up clutch, the hydraulic pressure in the second hydraulic chamber becomes higher compared to that in the first hydraulic chamber. At this time, the unidirectional throttle valve regulates the flow of the hydraulic oil from the second hydraulic chamber to the first hydraulic chamber. Consequently, lowering the hydraulic pressure in the second hydraulic chamber becomes difficult. Therefore, the moving speed of the piston to the front cover becomes faster.

In the torque converter in accordance with one preferred embodiment of the present invention, the unidirectional throttle includes a disk-shaped elastic member disposed in between the front cover and the opposite member of the piston, the inner periphery of which elastic member is fixedly coupled to the piston and the outer periphery is disposed on the front cover side, and a friction facing that is fixedly coupled to the outer periphery of the elastic member and is opposite the front cover.

In the torque converter in accordance with one preferred embodiment of the present invention, the unidirectional throttle valve includes a disk-shaped elastic member and a friction facing. Therefore, its structure is simple and has few parts.

The torque converter in accordance with one preferred embodiment of the present invention includes a front cover on the power input side, an impeller, a turbine, a stator, a piston, an elastic member, and a friction facing. The impeller is coupled to the front cover and forms the hydraulic chamber. The turbine is opposite the impeller inside the hydraulic chamber. The stator is disposed between the impeller and the turbine. The piston, that is disposed to divide the space between the front cover and the turbine into the first hydraulic chamber on the front cover side and the second hydraulic chamber on the turbine side, can move close to and away from the front cover by the pressure difference between the first and second hydraulic chambers, and is coupled to the turbine to enable the torque to be transmitted. The elastic member is fixedly coupled to the piston and is opposite the front cover. The friction facing is fixedly coupled to the elastic member and is adjacent to the front cover. The friction facing is pressed against the front cover by the elastic member at least when the piston is disposed closest to the turbine and there is no pressure difference between the first and the second hydraulic chambers.

In the torque converter in accordance with one preferred embodiment of the present invention, where the piston is positioned closest to the turbine, although the hydraulic pressure in the first hydraulic chamber becomes somewhat higher than the hydraulic pressure in the second hydraulic chamber, the friction facing is pressed against the front cover by the elastic member. Therefore, when the hydraulic pressure in the second hydraulic chamber increases when the lock-up clutch is engaged, the hydraulic oil has difficulty flowing from the second hydraulic chamber to the first hydraulic chamber. Specifically, it becomes difficult to lower the hydraulic pressure in the second hydraulic chamber. As a result, the moving action of the piston becomes rapid while the lock-up clutch is engaged.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
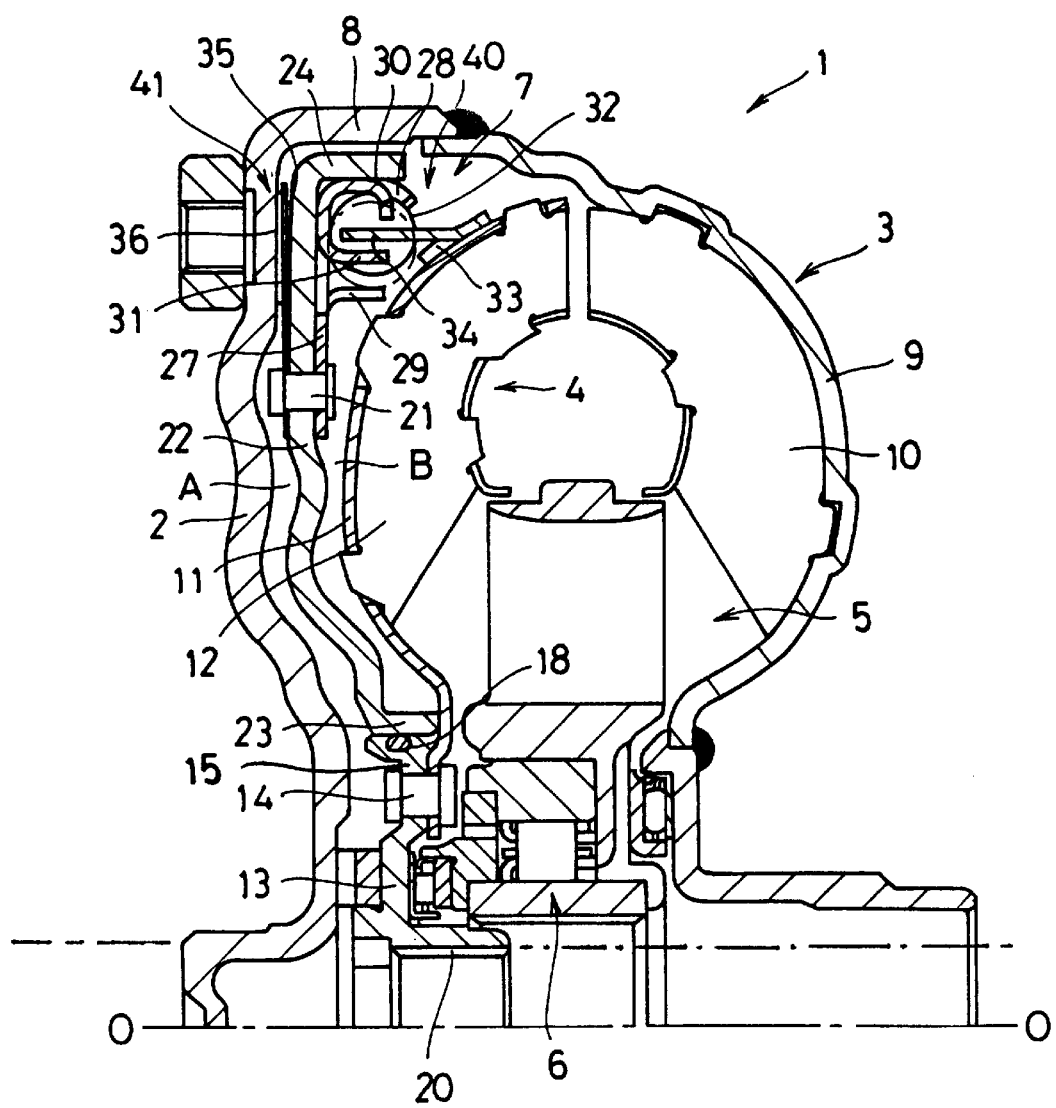
FIG. 1 is a partial vertical cross-sectional view of a torque converter in accordance with one preferred embodiment of the present invention.

Referring initially to FIG. 1, a torque converter 1 is illustrated in accordance with one embodiment of the present invention. The torque converter 1 is especially adapted to be used in motor vehicles. In particular, the torque converter 1 is a mechanism for transmitting torque from a crankshaft (shown in broken lines in FIG. 1) and a main drive shaft (shown in broken lines in FIG. 1) of a transmission (not shown). The engine is positioned to the left of the torque converter I as viewed in FIG. 1, while the transmission is positioned to the right of the torque converter 1 as viewed in FIG. 1. Centerline O—O in FIG. 1 represents the axis of rotation of the torque converter 1.

As shown in FIG. 1, the torque converter 1 basically includes a front cover 2 on the input side, a converter main body and a lock-up clutch 7. The converter main body basically includes three main turbine elements, namely, an impeller 3, a turbine 4, a stator 5 and piston 22.

The impeller 3 forms a hydraulic fluid chamber together with the front cover 2. The turbine 4 opposes the impeller 3 within the hydraulic fluid chamber. The stator 5 is disposed between the impeller 3 and the turbine 4. The piston 22 is disposed so as to divide the space between the front cover 2 and the turbine 4 into a first hydraulic chamber A and a second hydraulic chamber B. The piston 22 can approach and leave the front cover 2 according to the differential pressure between the first and second hydraulic chambers A and B.

The torque converter 1 forms a hydraulic chamber with the front cover 2 and the impeller shell 9. In particular, the impeller shell 9 is fixedly coupled to the outer projection 8 of the front cover 2. The front cover 2 can be installed to the structural components of the engine, which are not shown, so that the torque from the engine is transmitted to the front cover 2. A plurality of impeller blades 10 is fixedly coupled to the interior of the impeller shell 9. The impeller 3 is constructed from the impeller shell 9 and the impeller plates 10. The turbine 4 is disposed at the position opposite the impeller 3 in the hydraulic chamber. The turbine 4 is constructed from the turbine shell 11 and the plurality of turbine blades 12. The turbine blades 12 are fixedly coupled to the surface of turbine shell 11. The inner periphery of the turbine shell 11 is fixedly coupled to the flange 15 of the turbine hub 13 by the rivets 14. The turbine hub 13 has a central bore with a plurality of spline grooves 20 for coupling the main drive shaft (not shown) of the transmission to its interior.

The stator 5 is disposed between the radially inside of the impeller 3 and the interior of the turbine 4. The stator 5 controls the direction of the hydraulic oil returned from the turbine 4 to the impeller 3 to regulate a torque ratio. The stator 5 is supported on a fixed shaft, not shown, extending from the transmission by the oneway clutch 6.

The lock-up clutch 7 is disposed in the space between the front cover 2 and the turbine 4. The lock-up clutch 7 is a structure for mechanically coupling the front cover 2 to the turbine 4. The lock-up clutch 7 primarily includes a piston 22 and an elastic coupling mechanism 40 for elastically coupling the piston 22 to the turbine 4.

The piston 22 is a disk-shaped member disposed to divide the space between the front cover 2 and the turbine shell 11 into the first hydraulic chamber A on the front cover 2 side and the second hydraulic chamber B on the turbine 4 side. The piston 22 is preferably constructed of a thin metal plate. The piston 22 has an inner tubular or cylindrical portion 23 and an outer tubular or cylindrical portion 24 with a disc-shaped portion (opposing portion) of the piston 22 located therebetween. The inner tubular portion 23 of piston 22 extends toward the transmission side of the torque converter at its inner circumferential portion. The inner tubular portion 23 of piston 22 is supported to allow relative motion in the axial direction and the circumferential direction on the outer surface of the flange 15 of the turbine hub 13.

A seal ring 18 is disposed between the inner tubular portion 23 of piston 22 and the flange 15 of the turbine hub 13. In particular, the seal ring 18 is located in a groove formed on the outer surface of the flange 15 of the turbine hub 13 for sealing the inner peripheries of the first hydraulic chamber A and the second hydraulic chamber B.

The outer tubular portion 24 of the piston 22 is formed on the radially outer peripheral portion of the piston 22 and extends axially towards the transmission side of the torque converter 1.

The elastic coupling mechanism 40 is disposed between the piston 22 and the turbine 4. More specifically, the elastic coupling mechanism 40 is disposed between the outer peripheral portion of the piston 22 and the outer peripheral portion of the turbine shell 11. The elastic coupling mechanism 40 basically includes a retining plate 27 as a part of the drive member, a driven plate 33 as a part of the driven member, and a plurality of coil springs 32, which are disposed between both the plates 27 and 33. The retaining plate 27 is an annular plate member, which is disposed on the transmission side of the outer peripheral portion of the piston 22. Specifically, the retaining plate 27 is disposed on the inner periphery of the outer tubular portion 24. The interior of the retaning plate 27 is fixedly coupled to the piston 22 by a plurality of rivets 21. The retaining plate 27 not only holds the coil springs 32, but also transmits the torque by coupling both ends of the coil springs 32 in the circumferential direction. The retaining plate 27 has the holders 28 and 29 which respectively support the radially outside and inside of the plurality of coil springs 32 such that the coil springs 32 arranged in the circumferential direction. The holders 29 are formed by cutting a portion of the retaining plate 27 on the inner circumference side of the coil springs 32 and then bending it out of the plane of the retaining plate 27 so as to extend in a radial direction.

Furthermore, the retaining plate has coupling members 30 and 31 to support both ends of each coil spring 32 in the circumferential direction. The coupling members 30 and 31 are formed by cutting a portion of the retaining plate 27 at the ends of the coil springs 32 and then bending it out of the plane of the retaining plate 27 so as to extend in a radial direction.

The driven plate 33 is an annular plate, which is fixedly coupled to the outer surface of the turbine shell 11. The driven plate 3 has a plurality of claws 34 extending axially therefrom towards the engine side of the torque converter. The claws are spaced apart from each other in the circumferential direction on the driven plate 33. The claws 34 engage both ends of each of the coil springs 32 in the circumferential direction. Therefore, the torque from the retaining plate 27 is transmitted to the driven plate 33 through the coil springs 32.

Figure 2:
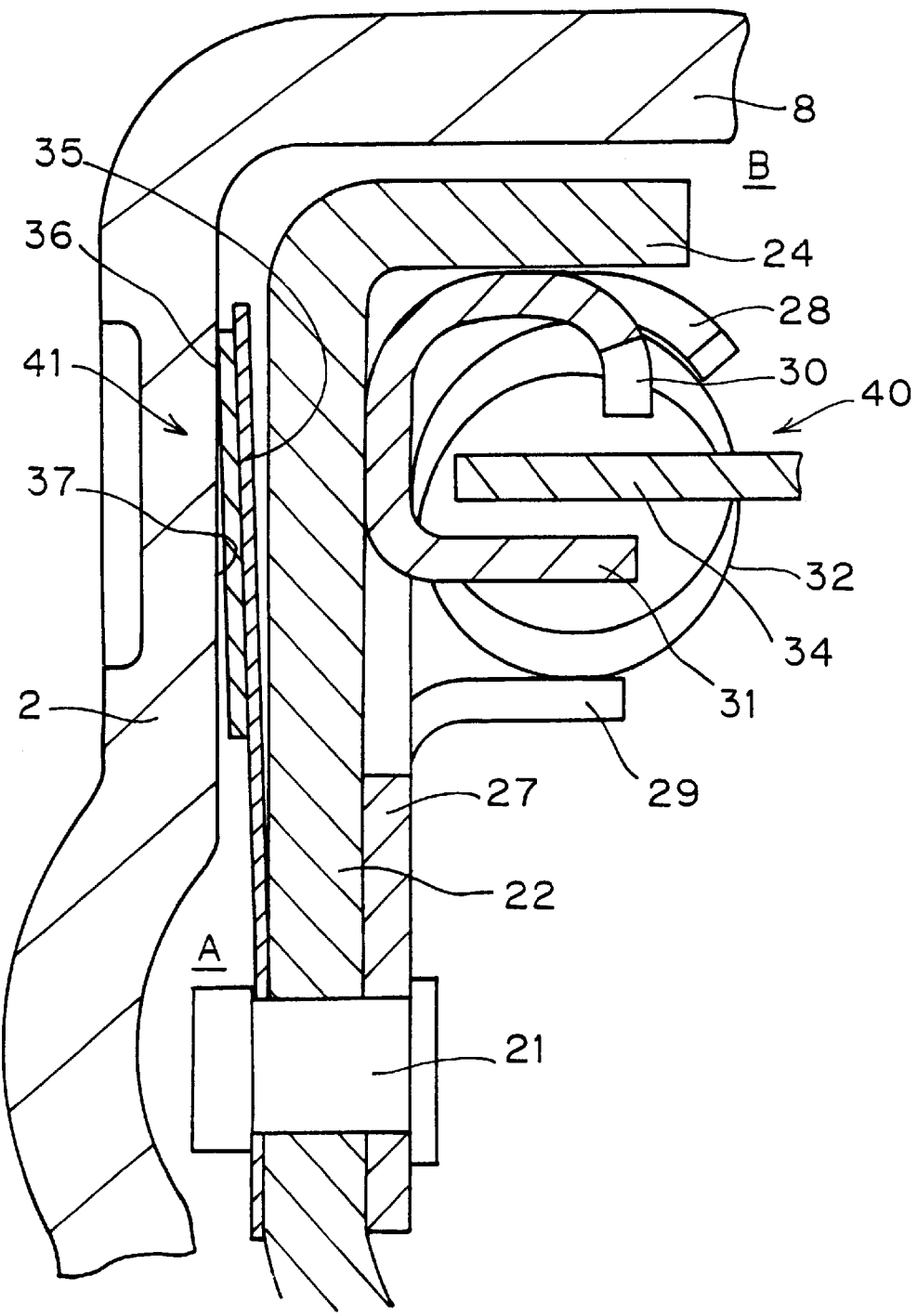
FIG. 2 is an enlarged, partial vertical cross-sectional view of a portion of the lock-up clutch of a torque converter illustrated in FIG. 1 in a first position in accordance with one preferred embodiment of the present invention.

Now referring to FIG. 2, the frictional coupling member 41 will now be described with reference to this Figure in particular. The frictional coupling member 41 is formed between the axially facing surface of the piston 22 and the axially facing surface of the front cover 2. The main part of frictional coupling member 41 is fixedly coupled to the axially facing surface of the piston 22, which faces the axially facing surface of the front cover 2. The frictional coupling member 41 is located at the radially outer circumferential portion of the piston 22. The frictional coupling member 41 basically includes a plate spring 35 with a friction facing 36 coupled to the piston 22 and a flat, annular friction surface 37 formed on the front cover 2. The flat, annular friction surface 37 of the front cover 2 is opposite the friction facing 36 of the spring plate 35 such that the friction facing 36 engages the friction surface 37 to lock the piston 22 to the front cover 2. The frictional coupling member 41 is a flow restraining member or valve that prevents hydraulic oil or fluid from freely passing from the first hydraulic chamber A to the second hydraulic chamber B.

The plate spring 35 (elastic member) is an annular member, which is disposed on the engine side of the disc-shaped portion (opposing portion) of the piston 22. Another type of elastic member can be used instead of the plate spring 35 if needed and/or desired. The plate spring 35 is located at the outer circumference of the piston 22. The plate spring 35 has a cone shape with its outer circumference being positioned towards the engine side of the torque converter 1 in the free state and its inner circumference being positioned towards the transmission side of the torque converter 1. The inner circumferences of the plate spring 35 and the retaining plate 27 are fixedly coupled to the piston 22 by the rivets 21 as described earlier. Of course, it is possible that the spring 35 can be coupled to the front cover 2 and the friction surface 37 can be located on the piston 22.

In the preferred embodiment, the outer circumference of the plate spring 35 is slightly separated from the outside surface of the piston 22. The outer circumference of the plate spring 35 is adjacent to the friction surface 37 of the front cover 2. The friction facing 36 is composed of an annular paper material, which is fixedly coupled by an adhesive, for example, to the outer side surface on the outer circumference of the plate spring 35. Specifically, the friction facing 36 is coupled to the side of the plate spring 35 that faces towards the engine side of the torque converter 1. The friction facing 36 presses against the friction surface 37 of the front cover 2 by the plate spring 35 even when engagement of the lock-up clutch 7 is released and when the piston 22 is closest to the turbine 4. Specifically, in the clutch release position, the outer circumferential surface of the friction facing 36 comes into contact with the friction surface 37, while a gap is formed between the inner circumference of the friction facing 36 and the friction surface 37.

This engagement of the friction facing 36 with the friction surface 37 occurs because the plate spring 35 is set so that the following two conditions are met. First, when the piston 22 is positioned closest to the turbine 4, the plate spring 35 is slightly compressed between the front cover 2 and the piston 22. In other words, the dimensions of the plate spring 35 are set so that the friction facing 36 normally presses against the front cover 2. Second, the biasing load of the plate spring 35 towards the side surface of the front cover 2 is set so that the friction facing 36 does not separate from the friction surface 37 of the front cover 2 due to the pressure difference between hydraulic chambers A and B even while the lock-up clutch 7 is released.

The action of the torque converter 1 will now be described in more detail. When the torque is transmitted from the engine to the front cover 2, the impeller 3 rotates with the front cover 2. Therefore, the hydraulic oil flows from the impeller 3 to the turbine 4, which in turn causes rotation of the turbine 4. The torque of the turbine 4 is then transmitted to the main drive shaft of the transmission, which is not shown. When the torque is transmitted through the hydraulic oil in this way (specifically, when the lock-up clutch 7 is released), the friction facing 36 of the piston 22 is in contact with the friction surface 37 of the front cover 2. Therefore, the torque from the front cover 2 is transmitted by the lock-up clutch 7 although the amount of torque being transmitted is small.

Figure 3:
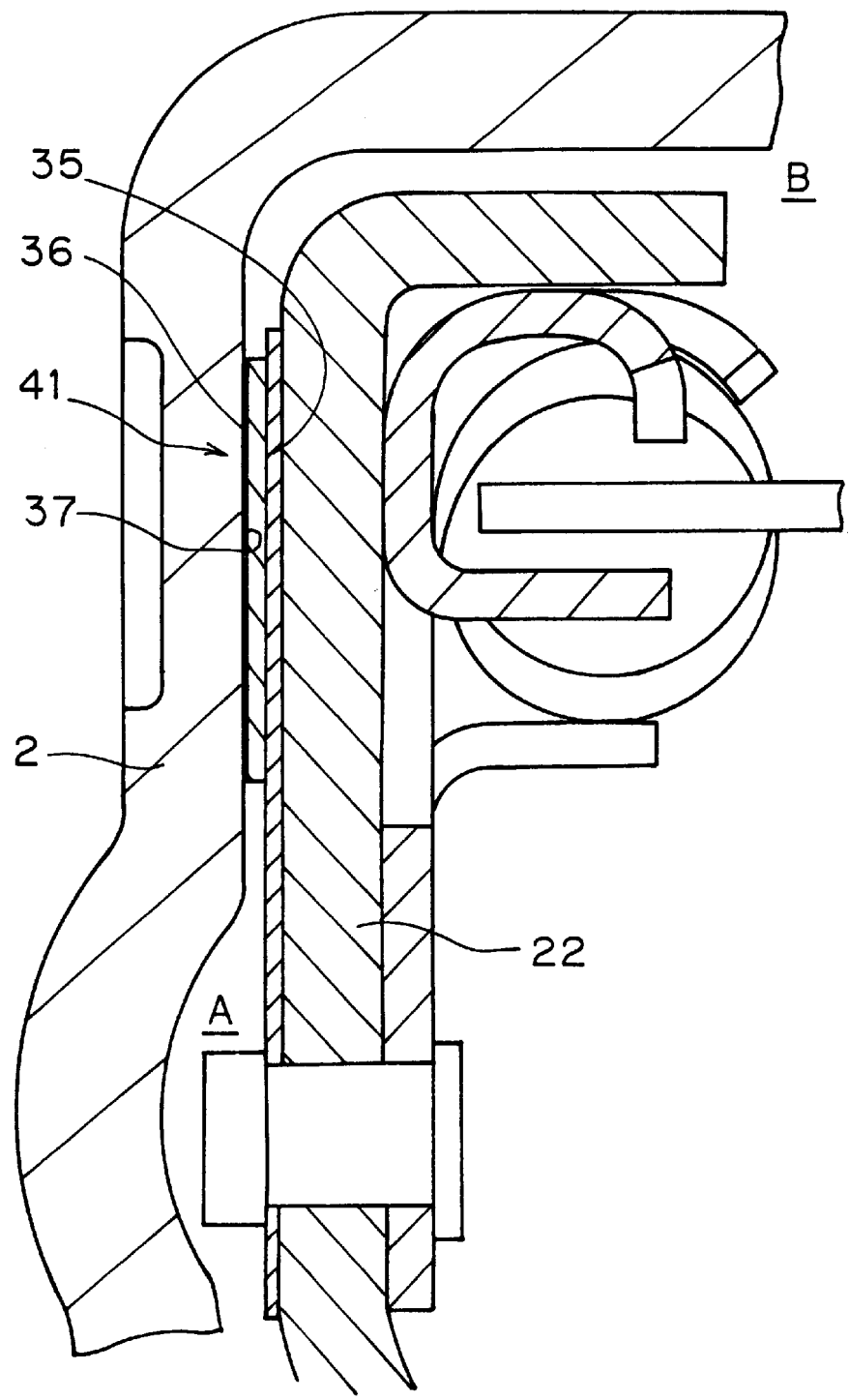
FIG. 3 is an enlarged, partial vertical cross-sectional view of the portion of the lock-up clutch of the torque converter illustrated in FIG. 1 in a second position in accordance with one preferred embodiment of the present invention.

While the lock-up clutch 7 is being engaged, the hydraulic oil in the first hydraulic chamber A is drained from its radially inner periphery. Then hydraulic oil is supplied to the second hydraulic chamber B. The result is the hydraulic pressure in the second hydraulic chamber B becomes higher compared to the hydraulic pressure in the first hydraulic chamber A. At this time, the hydraulic oil in the second hydraulic chamber B has difficulty flowing to the first hydraulic chamber A because of the plate spring 35 and the friction facing 36. Specifically, the plate spring 35 and the friction facing 36 function as the sealing members between the first hydraulic chamber A and the second hydraulic chamber B. Thus, since the flow of the hydraulic oil from the second hydraulic chamber B to the first hydraulic chamber A is restrained, it is urkely that the hydraulic pressure in the second hydraulic chamber B will be lowered. Therefore, the moving speed of the piston 22 is unlikely to slow down. When the piston 22 moves to the engine side, as shown in FIG. 3, the plate spring 35 becomes flat and its outer circumference contacts or adheres to the piston 22. Additionally, the entire friction facing 36 contacts or adheres to the friction surface 37. Therefore, the torque of the front cover 2 is transmitted to the piston 22.

Another Embodiment

Figure 4:
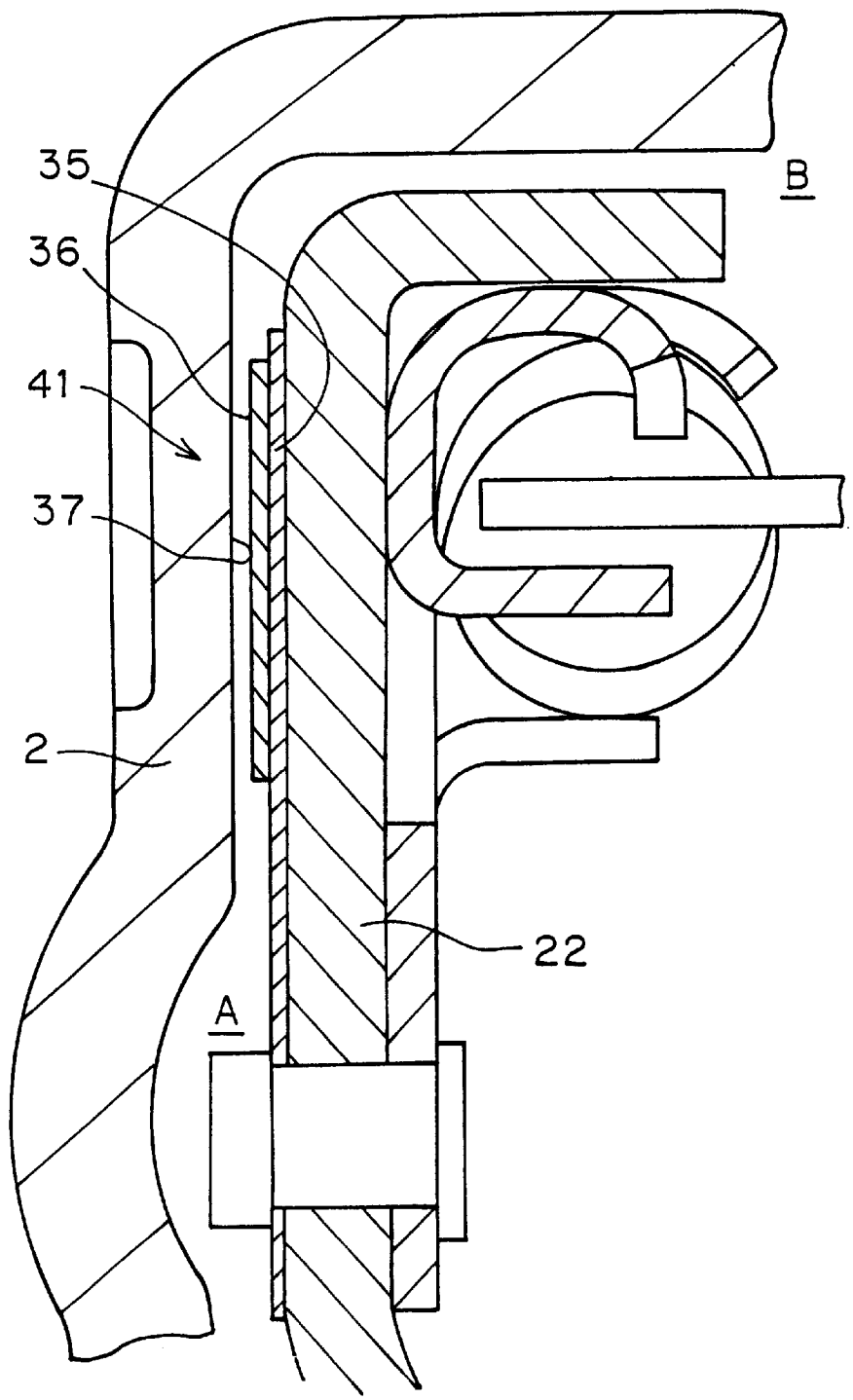
FIG. 4 is an enlarged, partial vertical cross-sectional view of a portion of a lock-up clutch for a torque converter in accordance with another embodiment of the present invention.

Referring now to FIG. 4, a portion of a modified torque converter will be described in accordance with another embodiment of the present invention. This second embodiment is similar to the first embodiment, except that the biasing force of plate spring 35 has been changed. Thus, the second embodiment will not be shown or described in as much detail as the first embodiment. In the following description of the second embodiment of the present invention, parts and portions which are the same as or similar to those of the first embodiment will be given the same reference numbers.

The plate spring 35 and the friction facing 36 of this embodiment can function as a unidirectional throttle valve. The function of the unidirectional throttle valve allows the hydraulic oil to flow from the first hydraulic chamber A to the second hydraulic chamber B and restrains the flow of the hydraulic oil from the second hydraulic chamber B to the first hydraulic chamber A.

When the lock-up clutch 7 (shown in FIG. 1) is released, the hydraulic pressure in the first hydraulic chamber A becomes higher than the hydraulic pressure in the second hydraulic chamber B. As shown in FIG. 4, the radially outer portion of the plate spring 35 bends toward the piston 22 to separate the friction facing 36 from the friction surface 37 of the cover 2. This means that the first condition for setting the plate spring 35 of the first embodiment, described earlier, is satisfied,but the second condition of the first embodiment is not satisfied. The result is that a gap is created between first hydraulic chamber A and second hydraulic chamber B. The gap extends in the radial direction, and is maintained between the friction surface 37 and the friction facing 36. As a result, the hydraulic oil in the first hydraulic chamber A moves outwardly in the radial direction, passes between the friction surface 37 and the friction facing 36, passes between the outer tubular portion 24 and the outer projection 8, and then flows into the second hydraulic chamber B. Therefore, the friction surface 37 and the friction facing 36 can be adequately cooled.

When the lock-up clutch 7 is moved from the state shown in FIG. 4, the hydraulic oil in the first hydraulic chamber A is first drained from the inner circumference. In addition, the hydraulic oil is supplied to the second hydraulic chamber B. By doing this, the plate spring 35 and the friction facing 36 move quickly together from the state shown in FIG. 4 to the state shown in FIG. 2. Specifically, the outer circumference of the plate spring 35 moves towards the friction surface 37 of the cover 2. Therefore, the outer circumference of the friction facing 36 comes into contact with the friction surface 37. As a result, it is difficult for the hydraulic oil in the second hydraulic chamber B to flow into the first hydraulic chamber A. Therefore, the hydraulic pressure in the second hydraulic chamber B does not decrease, and the moving speed of the piston 22 does not become slower. Furthermore, as time elapses, the piston 22 moves from the state shown in FIG. 2 to the state shown in FIG. 3, and thus, the lock-up clutch 7 is completely engaged.

In the torque converter 1 of the present invention, the space between the first hydraulic chamber A and the second hydraulic chamber B is normally closed by an elastic member 35. When the lock-up clutch 7 is engaged, the speed of the piston 22 moving toward the front cover 2 is faster than prior art torque converters.

While only two preferred embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A torque converter for transmitting torque from a power input shaft to an output shaft, said torque converter comprising:

a front cover being adapted to be coupled to the power input shaft;

an impeller connected to said front cover to form a hydraulic chamber with said front cover;

a turbine disposed opposite said impeller and disposed inside said hydraulic chamber, said turbine being adapted to be coupled to the output shaft;

a stator disposed between said impeller and said turbine;

a piston disposed between said front cover and said turbine to form a first hydraulic chamber located between said piston and said front cover and a second hydraulic chamber located between said piston and said turbine, said piston being configured to move close to and away from said front cover by a fluid pressure difference between said first and second hydraulic chambers, said piston having an opposing portion that is opposite said front cover, said piston being coupled to said turbine to transmit torque; and a unidirectional throttle valve disposed between said first hydraulic chamber and said second hydraulic chamber to allow hydraulic oil to flow from said first hydraulic chamber to said second hydraulic chamber and to reguilate the flow of hydraulic oil from said second hydraulic chamber to said first hydraulic chamber, said unidirectional throttle valve being operable to open upon pressure in said first hydraulic chamber becoming greater than pressure in said second hydraulic chamber when said piston is in a first position, said first position occurring when said piston is closest to said turbine.

2. The torque converter according to claim 1, wherein said unidirectional throttle valve includes an elastic member disposed between said front cover and said opposing portion of said piston with its inner portion being fixedly coupled to one of said front cover and said piston, and its outer portion being disposed against one of said front cover and said piston, and a friction facing being opposite said front cover and fixedly coupled to the outer periphery of said elastic member.

3. The torque converter according to claim 2, wherein said piston is coupled to said turbine by an elastic coupling mechanism which permits limited rotational movement between said piston and said turbine.

4. The torque converter according to claim 3, wherein said piston has an outer peripheral portion coupled to said turbine by said elastic coupling mechanism.

5. The torque converter according to claim 2, wherein said turbine has a turbine hub with a sealing member disposed between an inner peripheral portion of said piston and said turbine hub.

6. The torque converter according to claim 1, wherein said piston is coupled to said turbine by an elastic coupling mechanism which permits limited rotational movement between said piston and said turbine.

7. The torque converter according to claim 6, wherein said piston has an outer peripheral portion coupled to said turbine by said elastic coupling mechanism.

8. The torque converter according to claim 7, wherein said turbine has a turbine hub with a sealing member disposed between an inner peripheral portion of said piston and said turbine hub.

9. A torque converter for transmitting torque from a power input shaft to an output shaft, said torque converter comprising:

a front cover being adapted to be coupled to the power input shaft, an impeller connected to said front cover to form a hydraulic chamber with said front cover;

a turbine disposed opposite said impeller and disposed inside said hydraulic chamber, said turbine being adapted to be coupled to the output shaft;

a stator disposed between said impeller and said turbine;

a piston disposed between said front cover and said turbine to form a first hydraulic chamber located between said piston and said front cover and a second hydraulic chamber located between said piston and said turbine, said piston being configured to move close to and away from said front cover by a fluid pressure difference between said first and second hydraulic chambers, said piston being connected to said turbine to enable torque to be transmitted to said turbine; and an elastic member disposed between said front cover and said piston, said elastic member being fixedly coupled to one of said front cover and said piston; and a friction facing member being fixedly coupled to said elastic member, said friction facing member having a first side being at least partially pressed against the other of said front cover and said piston by said elastic member and a second side coupled to said elastic member, said elastic member being at least partially spaced from said one of said front cover and said piston to form a gap therebetween at least when said piston is disposed closest to said turbine and no substantial pressure difference exists between said first and second hydraulic chambers.

10. The torque converter according to claim 9, wherein said elastic member is a disk-shaped member with its inner periphery fixedly coupled to said piston and its outer periphery engaging said front cover.

11. The torque converter according to claim 10, wherein said piston is coupled to said turbine by an elastic coupling mechanism which permits limited rotational movement between said piston and said turbine.

12. The torque converter according to claim 11, wherein said piston has an outer peripheral portion coupled to said turbine by said elastic coupling mechanism.

13. The torque converter according to claim 12, wherein said turbine has a turbine hub with a sealing member disposed between an inner peripheral portion of said piston and said turbine hub.

14. The torque converter according to claim 9, wherein said elastic member has its inner periphery fixedly coupled to said piston and its outer periphery engaging said front cover.

15. The torque converter according to claim 9, wherein said piston is coupled to said turbine by an elastic coupling mechanism which permits limited rotational movement between said piston and said turbine.

16. The torque converter according to claim 9, wherein said turbine has a turbine hub with a sealing member disposed between an inner peripheral portion of said piston and said turbine hub.

17. A method of forming a torque converter which transmits torque from a power input shaft to an output shaft, comprising the steps of:

forming a hydraulic chamber between a front cover and an impeller for receiving hydraulic fluid;

positioning a turbine inside said hydraulic chamber such that said turbine is located opposite said impeller;

positioning a stator between said impeller and said turbine to direct the direction of the hydraulic fluid being fed back from said turbine to said impeller;

positioning a piston between said front cover and said turbine to form a first hydraulic chamber between a first side of said piston and said front cover and a second hydraulic chamber between a second side of said piston and said turbine, said piston being movably coupled between said front cover and said turbine from a first position to a second position by a fluid pressure difference between said first and second hydraulic chambers, said first position occurring when said piston is closest to said turbine;

coupling said piston to said turbine to enable torque to be tranitted to said turbine; and providing a lock-up clutch with a flow restraining member between said piston and said front cover to couple said piston and said front cover together when said piston is in said second position to transmit torque, said flow restraining member restricting hydraulic fluid from passing between said first hydraulic chamber and said second hydraulic chamber at least when fluid pressure in each of said first and second hydraulic clambers is substantially equal to each other or fluid pressure is greater in said second hydraulic chamber when said piston is in said first position with said lock-up clutch released.

18. The method of forming a torque converter according to claim 17, wherein said flow restraining member comprises an elastic member and a friction facing coupled to said elastic member.

19. The method of forming a torque converter according to claim 18, further comprising the step of setting said elastic member to form a unidirectional throttle valve between said first hydraulic chamber and said second hydraulic chamber.

20. The method of forming a torque converter according to claim 18, further comprising the step of setting said elastic member such that said friction facing and said elastic member always remains in contact with said front cover and said piston to restrict hydraulic fluid passing from said first hydraulic chamber to said second hydraulic chamber even when said fluid pressure is greater in said first hydraulic chamber than said second hydraulic chamber.

\* \* \* \* \*